(12) United States Patent
He et al.

(10) Patent No.: US 10,996,052 B2
(45) Date of Patent: May 4, 2021

(54) SENSING VEHICLE POSITIONS WITH OPTICAL SENSORS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 489 days.

(21) Appl. No.: 15/807,552

(22) Filed: Nov. 8, 2017

(65) Prior Publication Data

US 2018/0156607 A1 Jun. 7, 2018

Related U.S. Application Data

(60) Provisional application No. 62/430,269, filed on Dec. 5, 2016.

(51) Int. Cl.
  *G01B 11/26* (2006.01)
  *G01S 17/32* (2020.01)
  (Continued)

(52) U.S. Cl.
  CPC ............... *G01B 11/26* (2013.01); *B60T 7/12* (2013.01); *B60T 7/22* (2013.01); *B60T 8/17* (2013.01);
  (Continued)

(58) Field of Classification Search
  CPC ............ G01S 7/484; G01S 7/48; G01S 17/10
  See application file for complete search history.

(56) References Cited

U.S. PATENT DOCUMENTS

| 5,302,819 A | 4/1994 | Kassies |
| 5,302,835 A | 4/1994 | Bendett et al. |

(Continued)

FOREIGN PATENT DOCUMENTS

| CN | 1454323 A | 11/2003 |
| CN | 102680981 A | 9/2012 |

(Continued)

OTHER PUBLICATIONS

International Search Report from PCT/CN2017/107615 dated Feb. 7, 2018 (5 pages).

(Continued)

*Primary Examiner* — Luke D Ratcliffe
(74) *Attorney, Agent, or Firm* — Perkins Coie LLP

(57) ABSTRACT

An optical sensor can include a transmitter for transmitting a light and one or more optical receivers or sensors to receive light reflected from other vehicles and objects. The apparatus can include a first optical angle sensor to receive from an object first reflected light at a first angle between the object and the first angle sensor. The apparatus can further include a second optical angle sensor to receive second reflected light from the object at a second angle between the object and the second angle sensor. The first reflected light and the second reflected light can be the transmitted light reflected from the object. Circuitry can receive the first and second angles from the first and second optical angle sensors and can process the measured first and second angles to determine the position of the object.

39 Claims, 12 Drawing Sheets

(51) Int. Cl.
  *B60T 7/12* (2006.01)
  *G01S 17/48* (2006.01)
  *B60T 8/17* (2006.01)
  *B60T 7/22* (2006.01)
  *G01S 17/42* (2006.01)
  *G01S 17/931* (2020.01)

(52) U.S. Cl.
  CPC .............. *G01S 17/32* (2013.01); *G01S 17/42* (2013.01); *G01S 17/48* (2013.01); *G01S 17/931* (2020.01); *B60T 2201/022* (2013.01); *B60T 2210/32* (2013.01)

(56) References Cited

U.S. PATENT DOCUMENTS

| | | | |
|---|---|---|---|
| 5,825,481 | A | 10/1998 | Alofs et al. |
| 2003/0201380 | A1 | 10/2003 | Ockerse et al. |
| 2004/0066499 | A1 | 4/2004 | Rheme et al. |
| 2008/0285842 | A1 | 11/2008 | Plasberg et al. |
| 2011/0299059 | A1 | 12/2011 | Buettgen et al. |
| 2016/0047891 | A1* | 2/2016 | Campbell ............... G01S 17/32 702/150 |
| 2016/0116593 | A1 | 4/2016 | Kim et al. |
| 2017/0045613 | A1 | 2/2017 | Wang |
| 2017/0176575 | A1* | 6/2017 | Smits ................... G01S 17/10 |

FOREIGN PATENT DOCUMENTS

| | | |
|---|---|---|
| CN | 105467363 A | 4/2016 |
| CN | 105549023 A | 5/2016 |
| CN | 105717504 A | 6/2016 |
| CN | 105954718 A | 9/2016 |
| DE | 102008063988 A1 | 7/2010 |
| JP | 2015200935 A | 11/2015 |
| KR | 20050069060 A | 3/2006 |
| WO | 20060668401 | 6/2006 |

OTHER PUBLICATIONS

Examination Report for European Patent Application No. 17877390.9, dated Dec. 18, 2019 (6 pages).
Massot-Campos et al, "Optical Sensors and Methods for Underwater 3D Reconstruction", Sensors, vol. 15(12): 31525-31557, 2015.
Examination Report for European Patent Application No. 17877390.9, dated Jun. 4, 2020 (4 pages).
Office Action dated Jul. 3, 2020 for Chinese Patent Application No. 201780034184.5 (13 pages).

* cited by examiner

800

810 — Transmitting a light, wherein the light is modulated according to a predetermined pattern 820 — Receiving, at a first optical detector, a first reflected light from a reflection of the transmitted light at an object, wherein the first reflected light is received at a first angle between the object and the first optical angle sensor or at a first time 830 — Receiving, at a second optical detector positioned at a different position from the first optical sensor, a second reflected light from the object at a second angle between the object and the second optical angle sensor or at a second time 840 — Filtering, at circuitry, to leave a first signal representative of the first reflected light modulated according to the predetermined pattern and to leave a second signal representative of the second reflected light modulated according to the predetermined pattern, and to remove signals corresponding to other predetermined patterns 850 — Determining a position of the object from the first angle and the second angle, or from the first time and the second time

FIG. 8

SENSING VEHICLE POSITIONS WITH OPTICAL SENSORS

CROSS-REFERENCE TO RELATED APPLICATIONS

This patent document claims the benefit and priority of U.S. Provisional Patent Application No. 62/430,269, filed on Dec. 5, 2016. The entire content of the before-mentioned patent application is incorporated by reference as part of the disclosure of this application.

TECHNICAL FIELD

The present disclosure relates to optically sensing the positions of vehicles and objects.

BACKGROUND

Positioning of one or more objects in a surrounding area is an important piece of information for many applications, including, for example, situational awareness for automobile or other vehicle drivers or operators, for computer-aided vehicle control, or for autonomous or driverless vehicles. Such situational awareness requires information about nearby vehicles and objects. Information is needed about other vehicles moving in the same direction and in different directions, but even the most observant driver may not be able to look for crash threats in all directions or all of the time. Ideally, a vehicle sensor would identify the locations of all vehicles close enough to cause a crash.

SUMMARY

The disclosed technology can be implemented to provide methods, and apparatuses to determine a position of a vehicle or object. For example, a sensor consistent with the disclosed subject matter may be mounted on a car to determine the positions and features of nearby vehicles and objects. The disclosed subject matter can be used to provide optical sensing based coverage around a vehicle or a point of interest with improved positioning accuracy and at relatively low costs.

In one aspect, the disclosed technology can be implemented to construct an optical sensor apparatus can include a transmitter that produces light and modulates the produced light based on a predetermined pattern; a first optical angle sensor to receive from an object first reflected light at a first angle between the object and the first angle sensor; a second optical angle sensor positioned at a different position from the first angle sensor to receive second reflected light from the object at a second angle between the object and the second angle sensor; and circuitry to receive the first and second angles from the first and second optical angle sensors and to process the first and second angles to determine the position of the object.

In another aspect, the disclosed technology can be implemented to construct an optical sensor apparatus that includes a transmitter that produces light for optical sensing and modulates the light based on a predetermined pattern; a first optical sensor to receive from an object first reflected light from the object at a first time under illumination of the light transmitted from the transmitter; a second optical sensor positioned at a different position from the first optical sensor to receive second reflected light from the object at a second time under illumination of the light transmitted from the transmitter; and circuitry to receive the first and second times from the first and second optical sensors and to determine the position of the object based on the first time and the second time.

One or more of the following features can be included and may be combined in various combinations. The first and the second optical angle sensors may receive another modulated light according to another predetermined pattern, and the circuitry may filter out interference from the other modulated light. The first optical angle sensor may receive the first reflected light at a first time and the second optical angle sensor may receive the second reflected light at a second time. The circuitry may further determine the position of the object based on the first time and the second time. The predetermined pattern can include a swept frequency modulation. The position of the object may be determined from a frequency difference between the light and the first or second reflected light. The predetermined pattern may include a pseudo-noise sequence for reducing or eliminating interference from other light sources. The first optical angle sensor may coherently detect the first reflected light and the second optical angle sensor may coherently detect the second reflected light. The light may be generated by a laser. The first optical angle sensor may include a one or two dimensional array of photodiodes and the second optical angle sensor may include another one or two dimensional array of photodiodes. The first optical angle sensor may include a one or two dimensional position sensitive detector and the second optical angle sensor may include another one or two dimensional position sensitive detector. The first optical angle sensor may include a camera and the second optical angle sensor may include another camera.

The above and other aspects of the disclosed technology and their implementations are described in greater detail in the drawings, the description and the claims.

BRIEF DESCRIPTION OF THE DRAWINGS

FIG. 8 depicts an example of a process for determining the location of another vehicle or object, in accordance with some example embodiments;

Where possible, like reference numbers refer to the same or similar features in the drawings.

DETAILED DESCRIPTION

Figure 1:
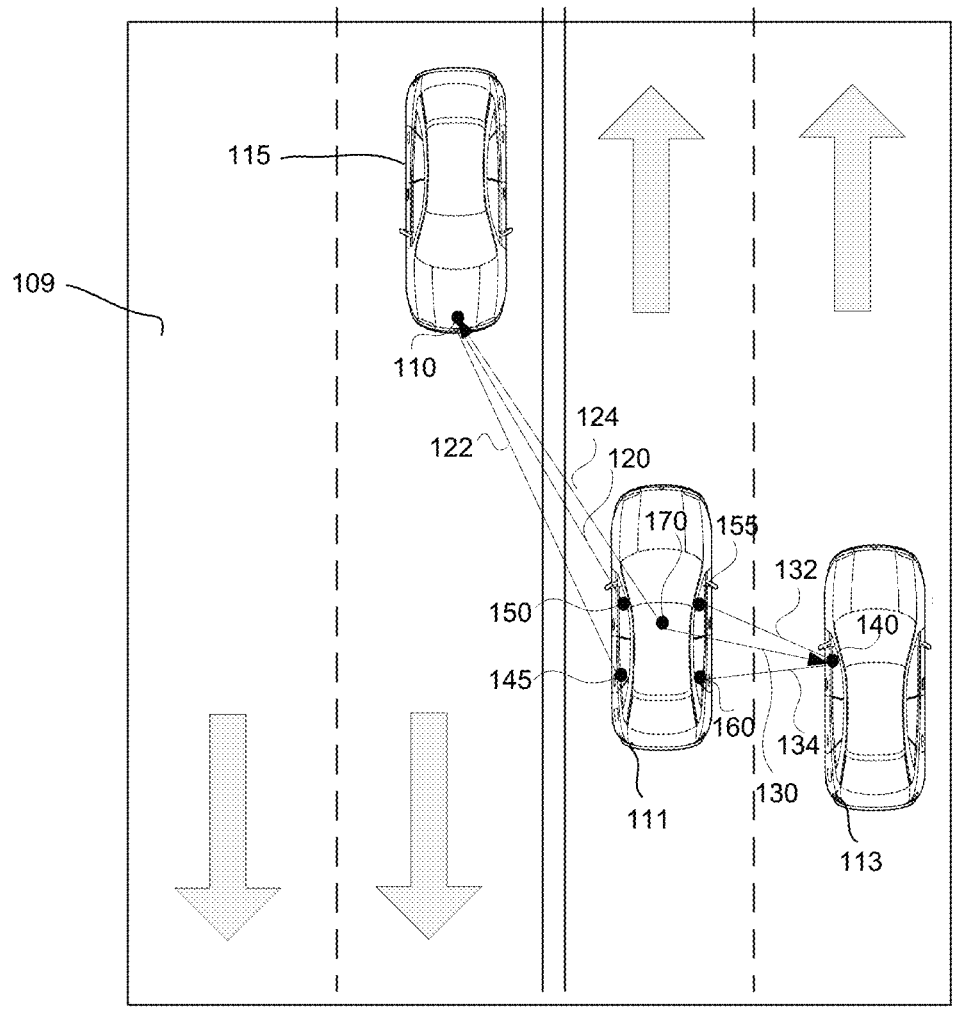
FIG. 1 depicts an example of a vehicle of interest and nearby vehicles, in accordance with some example embodiments.

The technology disclosed in this patent document can measure positioning of one or more objects in a surrounding area based on optical sensing and can be used to construct optical sensors with desired sensing capabilities at reduced costs than some other sensors, e.g., certain electronic sensors (such as radar sensors), certain ultrasonic sensors or certain LIDAR sensors that use pulsed laser light to illuminate a target and to measure reflected pulsed light.

The disclosed technology can be applied to various applications that require information on position and movement information of nearby or surrounding objects, including, for example, situational awareness for automobile or other vehicle drivers or operators, for computer-aided vehicle control, or for autonomous or driverless vehicles. In particular, multiple optical sensing positioning systems based on the disclosed optical sensing technology can be deployed at the same locale to operate independently of one another without causing interference. The following sections describe examples of using the disclosed optical sensing technology on vehicles to illustrate various features of the disclosed technology. The disclosed optical sensing technology can be used in other applications beyond positioning sensing for vehicles.

In the specific examples described below, one or more vehicle sensors based on the disclosed optical sensing technology are mounted on a vehicle of interest to provide information about nearby vehicles and objects and such optical sensing operations can aid situational awareness needed for safe driving and autonomous driving. Important information includes the locations of other vehicles and objects over a period of time. From time and location information, the speed, direction, and acceleration of the surrounding vehicles can be determined. Disclosed herein are optical position sensors mounted to a vehicle of interest that can be used to determine the locations of vehicles and objects. The optical position sensors may each include an optical transmitter and an optical receiver. The transmitter can transmit light in predetermined directions. For example, an optical source such as a laser can be scanned in a predetermined scan pattern in one dimension or in two dimensions using one or more motors. For example, a laser may be scanned in a two dimensional raster pattern. The transmitted light may illuminate other vehicles and objects resulting in reflected light from those vehicles and objects.

In some example embodiments, the optical source may be modulated according to a predetermined pattern. For example, the optical source amplitude may be modulated using on-off keying, amplitude modulation, phase modulation, modulating optical polarization or any other modulation according to the predetermined pattern such as a pseudo-random number (PN) sequence. Other vehicles with transmitters may operate using PN sequences that are different from the PN sequence used by the vehicle of interest. The receivers of the vehicle of interest may filter out the signals transmitted using PN codes that are different from the transmitter at the vehicle of interest. In some example embodiments, the optical receiver may include coherent detection to reduce or eliminate interference from lasers at other vehicles.

The light reflected back to the vehicle of interest from another vehicle or object may be detected by one or more optical receivers. In some example embodiments, an optical receiver can include optical angle detectors to determine the angles from the optical angle detectors to the other vehicles and/or objects. From the angles between the other vehicle or object and two or more optical angle detectors, the position of the other object or vehicle can be determined. The position of additional vehicles or objects can be determined in the same way. In some example embodiments, an optical receiver can include a time-of-flight detector to determine the time between the time that the light was transmitted and the time that the reflected light is received back at each time-of-flight detector. From the differences between two or more time-of-flight detectors in the arrival time of the reflected light, the position of the other object or vehicle can be determined. The position of additional vehicles or objects may be determined in the same way. In some example embodiments, the optical receiver may include coherent detection to reduce or eliminate interference from lasers at other vehicles. In some example embodiments, an optical detector may perform both angle sensing and time-of-flight sensing.

FIG. 1 depicts vehicle of interest 111 and other vehicles 113 and 117 on a road or highway carrying two-way traffic as indicated by the arrows where each direction has one or more lanes. In the example of FIG. 1, other vehicle 113 is heading in the same direction as the vehicle of interest 111, and vehicle 115 is heading in the opposite direction as is often the case on a highway or interstate. Vehicle of interest 111 can include an optical position sensor. Vehicles 113 and 115 may also include optical position sensors (not shown in the example of FIG. 1). Transmitter 170 at vehicle 111 can transmit light in a predetermined scan pattern such as a laser that is raster scanned by one or more motors. Transmitted light 120 directed at vehicle 115 may illuminate at 110 the front hood area, bumper area, quarter panel, wheel, and/or other area of vehicle 115. Reflected light 122 may be directed back to optical detector 145, and reflected light 124 may be directed back to optical detector 150. If detectors 145 and 150 are optical angle detectors, angles from each detector may be determined and from the angles, the position of vehicle 115 may be determined. If detectors 145 and 150 are time-of-flight detectors, the time-of-flight from the optical transmitter to each detector may be determined and from the times-of-flight, the position of vehicle 115 may be determined.

Transmitted light 130 directed at vehicle 113 may illuminate at 140 the door panel, quarter panel, window, wheel, and/or other area of vehicle 113. Reflected light 132 may be directed back to optical detector 155, and reflected light 134 may be directed back to optical detector 160. If detectors 155 and 160 are optical angle detectors, angles from each detector may be determined and from the angles, the position of vehicle 113 may be determined. If detectors 155 and 160 are time-of-flight detectors, the time-of-flight from the optical transmitter to each detector may be determined and from the times-of-flight, the position of vehicle 113 may be determined. In some example embodiments, optical detectors such as detector 145, 150, 155, and 160 may be both optical angle detectors and time-of-flight detectors. Combined detectors may provide improved position accuracy by averaging the time-of-flight position information with the angle based location information.

Figure 2:
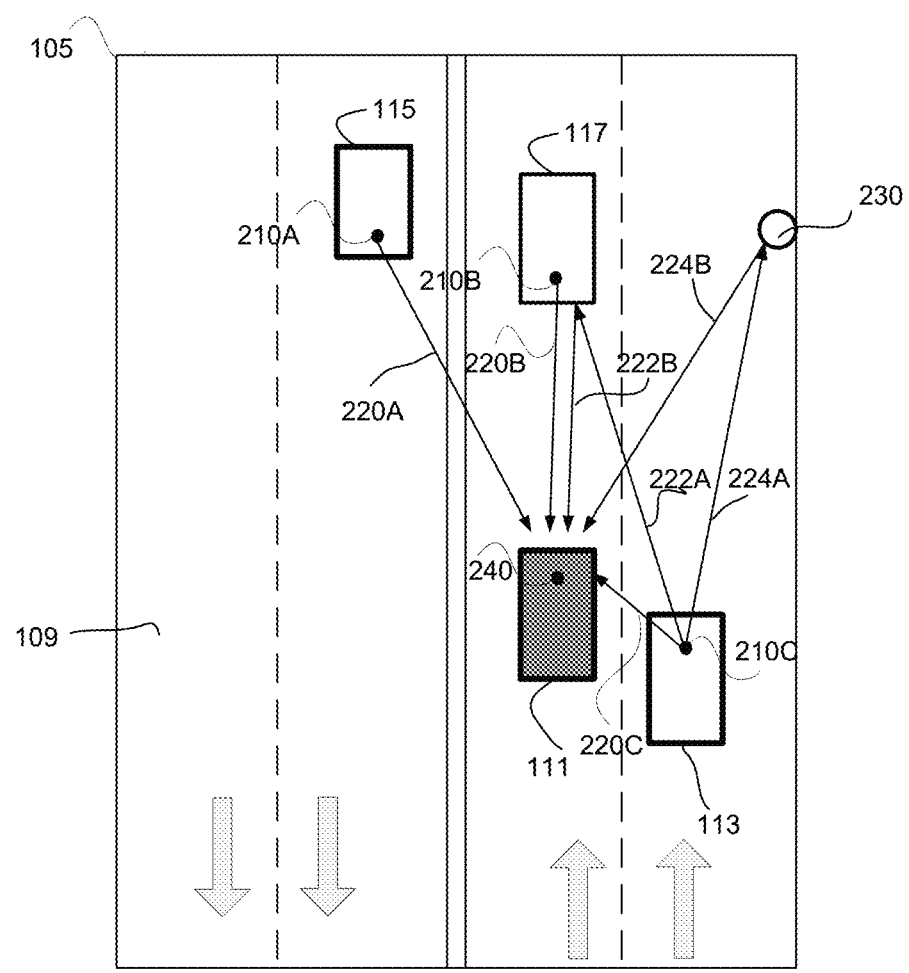
FIG. 2 depicts examples of sources of interference to a vehicle of interest from other vehicles and objects, in accordance with some example embodiments.

FIG. 2 depicts examples of sources of optical interference to vehicle of interest 111 from nearby vehicles 113, 115, and 117, and object 230. The description of FIG. 2 includes features from FIG. 1. Transmitter 210A at vehicle 115 can transmit light according to a pattern predetermined for vehicle 115. A portion of the light 220A from transmitter 210A may impinge on an optical receiver at optical sensor 240 at vehicle of interest 111. Transmitter 210B at vehicle 117 can transmit light according to a pattern predetermined for vehicle 117. A portion of the light 220B from transmitter 210B may impinge on an optical receiver at optical sensor 240 at vehicle of interest 111. Transmitter 210C at vehicle 113 can transmit light according to a pattern predetermined for vehicle 113. A portion of the light 220C from transmitter 210C may impinge on an optical receiver at optical sensor 240 at vehicle of interest 111. A portion of the light 224A from transmitter 210C may reflect off object 230 at 224B and impinge on optical sensor 240. A portion of the light 222A from transmitter 210C may reflect off vehicle 117 at 222B and impinge on optical sensor 240. The light at 220A, 220B, 220C, 222B, and 224B may be optical interference to the light transmitted from the transmitter in optical sensor 240 for determining the vehicles and objects near vehicle of interest 111. In some example embodiments, the interference due to the interference light from 220A, 220B, 220C, 222B, and/or 224B may be reduced or eliminated when transmitters 210A, 210B, and 210C use different predetermined sequences such as PN codes from the predetermined sequence used to modulate the light from optical sensor 240. In some example embodiments, the optical receiver in optical sensor 240 may use coherency of the light source in the transmitter in 240 to reduce or eliminate the interference from other light sources. For example, the optical receiver in optical sensor 240 may use coherent detection to reduce the interference caused by other sources such as 210A, 210B, and 210C.

Figure 3:
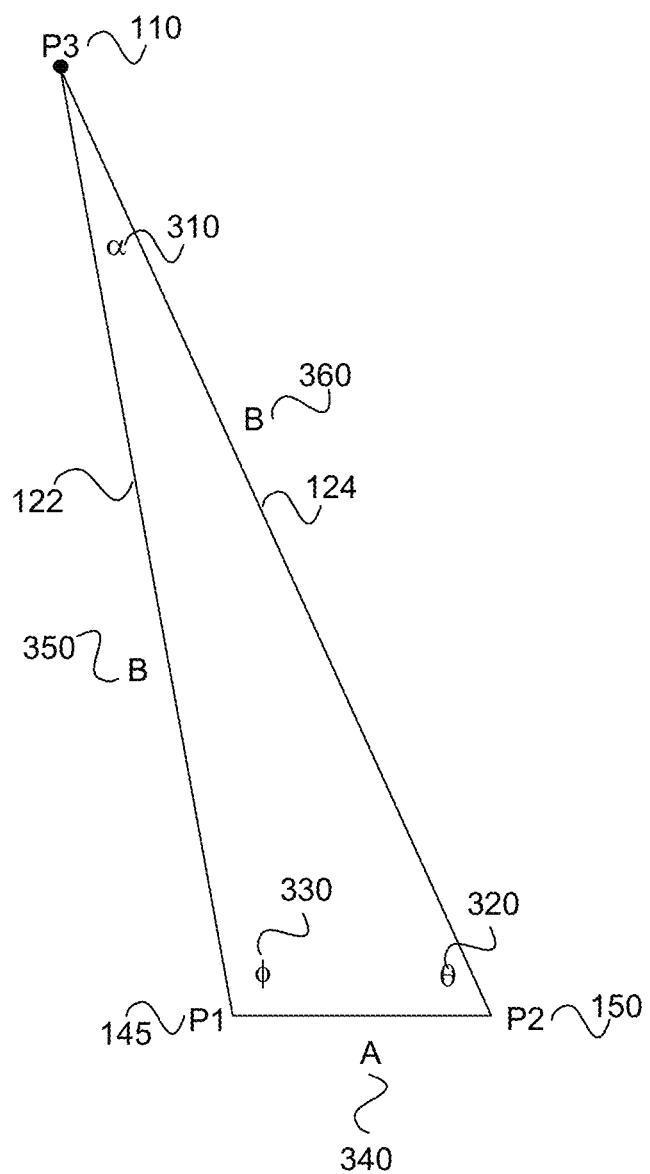
FIG. 3 depicts an example of determining the position of a vehicle from two angles determined by two optical angle detectors, in accordance with some example embodiments.

FIG. 3 depicts an example of determining the position of another vehicle such as vehicle 115 at 110 from two angles generated by two optical angle detectors such as 145 and 150. The description of FIG. 3 includes features from FIGS. 1-2. In the example of FIG. 3, optical angle detector 145 can determine angle ϕ, 330 between detector 145 and 110 on vehicle 115, and optical angle detector 150 can determine angle θ 320 between detector 150 and 110 on vehicle 115. The distance between optical angle detector 145 and 150 is the length A 340. With the forgoing quantities, the distance from optical angle detector 145 to the position 110 of the other vehicle 115, or length B 350, may be determined from:

$$B = A\frac{\sin\theta}{\sin\alpha} = A\frac{\sin\theta}{\sin(\theta + \phi)}, \quad \text{(Eq. 1)}$$

From A, ϕ, θ, and B, position 110 can be determined. Although the forgoing example included optical angle detectors 145 and 150 from FIG. 1, any pair of optical angle detectors may be used in this way to determine the position of a vehicle or object.

In some example embodiments, the optical detectors such as optical detectors 145 and 150 may be time-of-flight detectors. The time-of-flight detectors can determine the time between when the transmitted light is sent from the optical transmitter and when the light is received at the optical receiver. The time-of flight may correspond to the round trip time for the light to propagate from the transmitter to the reflecting object such as 110 and back. Using the speed of light, the distance can be determined from the time-of-flight. Based on the distances between the reflecting point such as 110 and each of the two optical detectors such as 145 and 150, the position of the reflecting point 110 can be determined.

Figure 4:
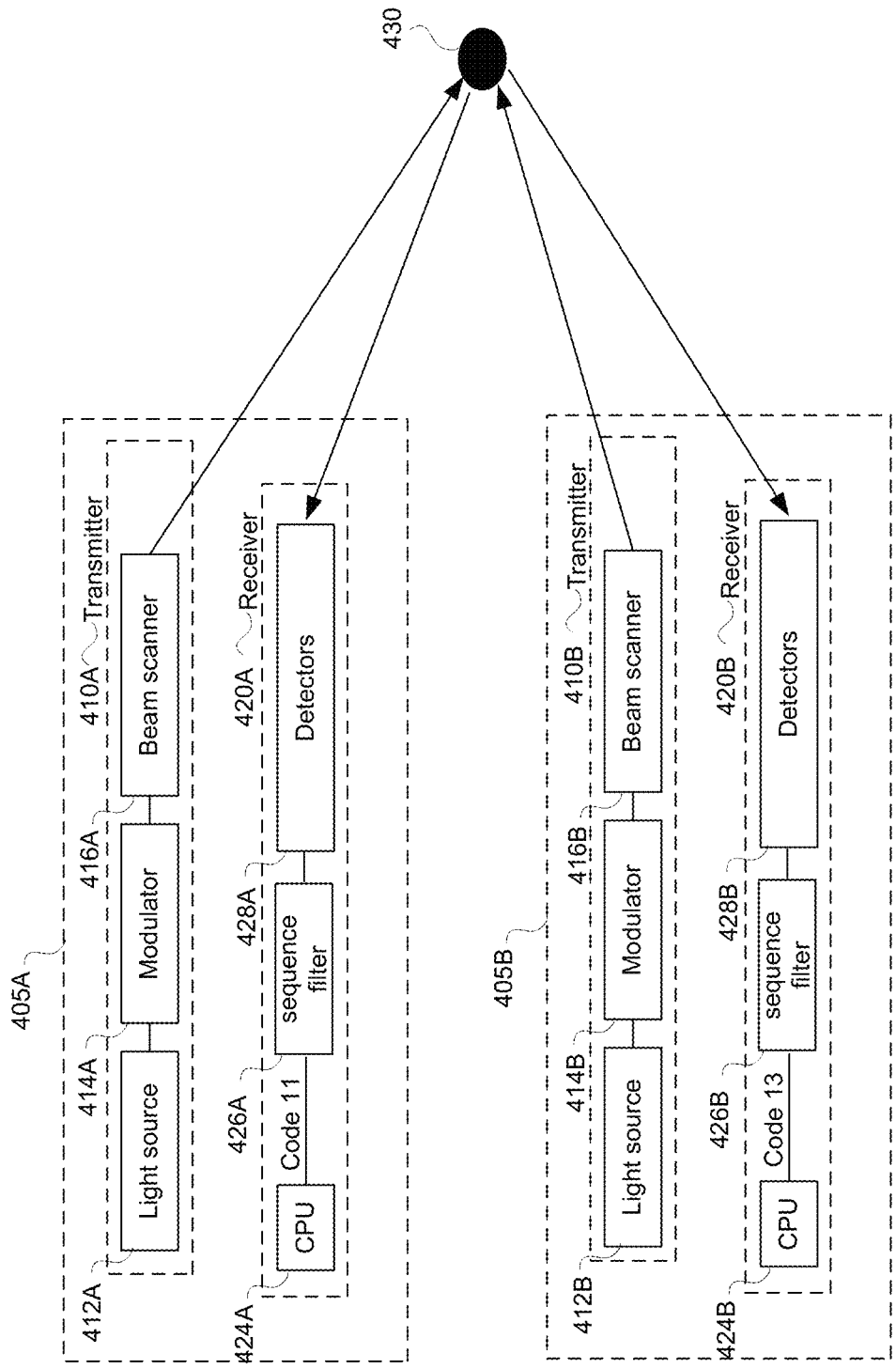
FIG. 4 depicts an example of two optical detectors illuminating an object or vehicle, in accordance with some example embodiments.

FIG. 4 depicts two optical transmitters illuminating an object or vehicle such as object 430 and reflected light returning back to two optical receivers. The description of FIG. 4 includes features from FIGS. 1-3. Optical sensor 405A includes transmitter 410A and receiver 420A, and optical sensor 405B includes transmitter 410B and receiver 420B. Transmitters 410A and 410B my both illuminate object 430 at the same time or nearly the same time. Receivers 420A and 420B receive light reflected from object 430. Optical sensor 405A may receive reflected light from transmitter 410A, may receive reflected light from transmitter 410B, and may receive light from other sources/reflections. For each optical sensor 405A or 405B, receiving light by its receiver 420A or 420B other than the light transmitted by its optical transmitter can interfere the proper optical sensing operation and the disclosed technology provides a mechanism to address this issue. Optical modulation with PN sequences unique to each optical sensor is one of approaches to handling this issue.

Transmitter 410A/410B can include light source 412A/412B which may include a laser such as a semiconductor laser or other laser, light-emitting diode (LED), or any other light source. Transmitter 410A/410B can include modulator 414A/414B which may modulate light source 412A/412B. For example, modulator 414A/414B may modulate light source 412A/412B using on-off keying, or amplitude modulation, frequency modulation, phase modulation, or optical polarization modulation. Modulator 414A/414B may modulate light source 412A/412B according to a pseudo-random (PN) sequence. For example, modulator 414A/414B may modulate light source 412A/412B using on-off keying according to a PN sequence. Modulator 414A may modulate light source 412A according to a different PN sequence than modulator 414B uses to modulate light source 412B. In another example, modulator 414A/414B may modulate light source 412A/412B according to a 100 MHz sinusoid with BPSK (binary phase shift keying) phase modulation applied according to a PN sequence. Optical sensor 405A using a different PN sequence from optical sensor 405B adds a "signature" to the transmitted light to enable optical receiver 420A to determine if received light corresponds to the "signature" of transmitter 410A. Similarly, the transmitter 410B is modulated according to a different PN sequence from 410A to enable receiver 420B to identify the "signature" of transmitter 410B.

In addition to providing the unique identification of light from different optical sensors, the disclosed optical sensing technology provides various techniques to allow each optical sensor to determine the positioning of each object as illustrated by the examples below.

In some implementations, receiver 420A/420B can include optical angle detectors, time-of-flight detectors, or hybrid detectors that perform both angle detecting and time-of-flight detecting. Receiver 420A/420B can include detectors 428A/428B which may include an array of photodetectors such as a one or two dimensional array of photodiodes, or can include one or two dimensional position sensitive devices. The detectors are further detailed in FIG. 5. Receiver 420A/420B can include sequence filter 426A/426B connected to detectors 428A/428B to reduce or eliminate signals corresponding to optical transmitters other than the optical transmitter corresponding to the receiver in the same optical sensor. In the example of FIG. 4, sequence filter 426A is chosen to allow signals from detector 428A corresponding to transmitter 410A, and to remove or eliminate signals from detector 428A corresponding to transmitter 410B. Similarly, sequence filter 426B is chosen to allow signals from detector 428B corresponding to transmitter 410B, and to remove or eliminate signals from detector 428B corresponding to transmitter 410A. In some example embodiments, sequence filters 426A/426B may be digital filters implemented on one or more processors. Central procession unit 424A/424B may include one or more processors, memory, and peripherals including peripheral interfaces. For example, CPU 424A/424B may include one or more wireless interfaces such as Bluetooth, WiFi or any other interface digital or analog interface.

Figure 5:
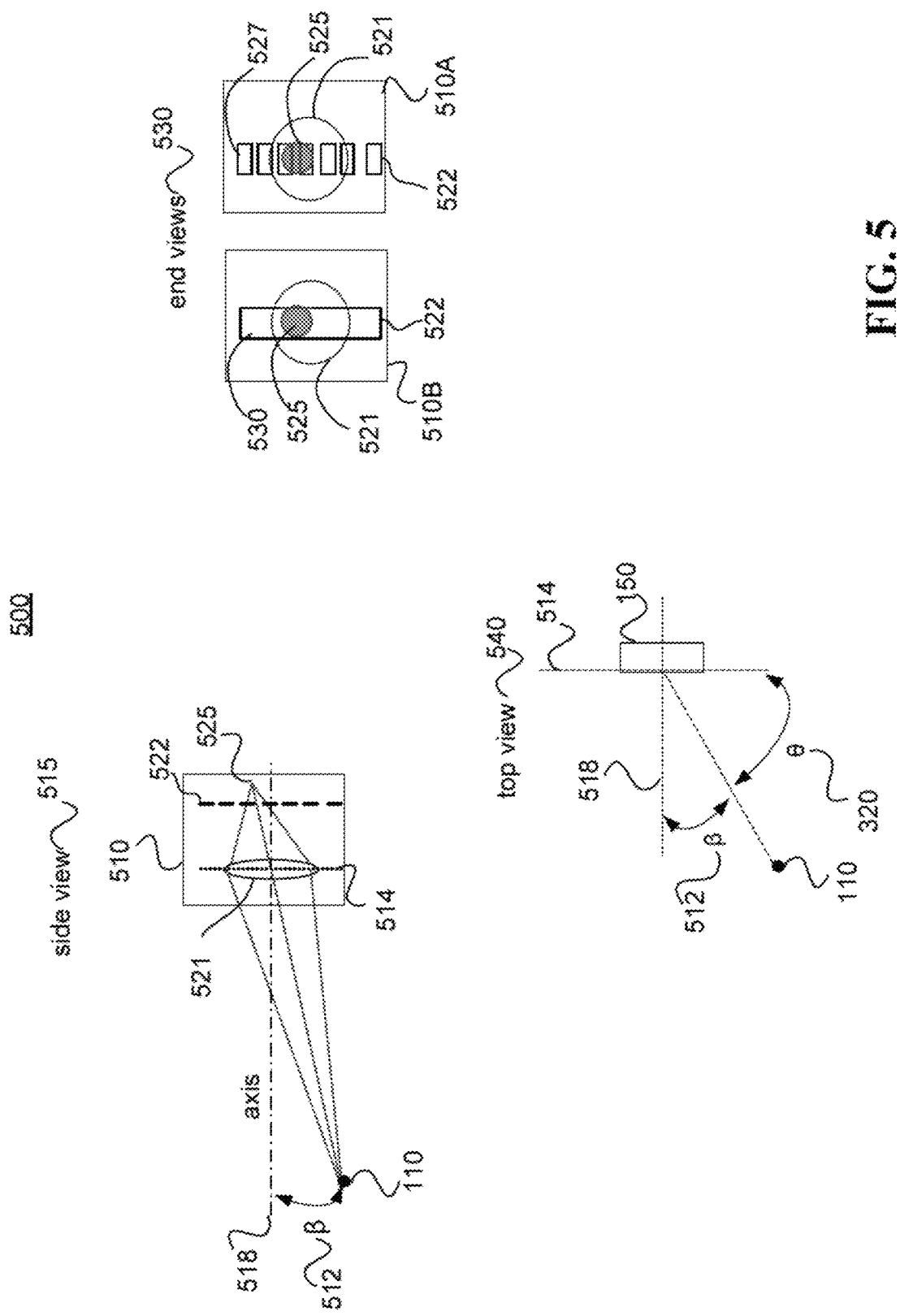
FIG. 5 depicts examples of a side view, a top view, and two end views of an optical detector, in accordance with some example embodiments.

FIG. 5 at 500 depicts an example of a side view, a top view, and two end views of an optical detector 410 such as optical detector 145, 150, 155, and/or 160. The description of FIG. 5 includes features from FIGS. 1-4. In some example embodiments, an optical detector may be an optical angle detector, a time-of-flight detector, of a hybrid angle and time-of-flight detector.

As an optical angle detector, optical detector 510 includes at least a lens 521 and an optical detector 522. Detector 522 can be a one or two dimensional array of photodetectors such as photodiodes, a one or two dimensional position sensitive detectors (PSD), a camera, or other optical detector. From the light within the field-of-view of lens 521, a spot of light 525 is produced by lens 521 at detector 522. The position of the spot of light 525 on detector 522 is determined by the angle 512 between the axis 518 of optical detector 510 and the direction to source, for example, at position 110. Optical detector 510 determines the angle such as angle 320 in FIG. 3 and/or angle 512. Angle 512 and angle 320 and/or 330 may be related by a geometric relationship such as the relationship between the axis 518 of optical angle detector 510 and an axis 514 normal to axis 518. For example, angles 512 and 320/330 may be related according to θ+β=90 degrees. The angles shown in FIGS. 1 and 3 may be related by other geometric relationships as well.

Optical detector 510 including lens 521 and detector 522 can be configured to sense light in a predetermined detection angle. For example, optical detector 150 can sense light in the hemisphere defined by plane 514 and including 110. The plane 514, or multiple planes may define a detection angle of 180 degrees as shown in FIG. 5, or any other angle such as 90 degrees. In some example embodiments, all the angle detectors associated with a primary vehicle including optical detectors 145, 150, 155, and 160, when combined can provide light detecting at any location around vehicle of interest 111. Lens 421 may include one or more optical components such as an optical lens, pinhole, and/or any other optical component.

Optical detector 510 may include a series of photodetectors 527 shown at 510A, or a position sensitive photodetector (PSD) 530 shown at 510B that measures a position of a beam spot along one or two directions on the optical sensing surface of the PSD 530, or a combination of both. For example, optical detector 510 may include an array of photodetectors 527. Each photodetector 527 may be a photodiode, photoresistor, phototransistor, or other optically active electronic component. In the example of FIG. 5 seven photodetectors are shown at 510A but any other number of photodetectors may be used as well. In some example embodiments, the position of spot 525 may be determined from which photodetectors 527 are responding to spot 525. For example, when photodetectors 527 are photodiodes, electrical current may be generated at the detectors in which spot 525 is illuminating. When spot 525 illuminates one photodetector only that photodetector responds to the light. When the spot illuminates more than one detector 527, the position of the spot may be determined by comparing the response of multiple photodetectors. For example, when the spot illuminates two photodetectors, a difference current may determine the position of the spot, or a ratio of the two currents may determine the position of the spot.

In another example, optical detector 510 may include position sensitive detector (PSD) 530. Position sensitive detector 530 may produce one or more currents from which the position of spot 525 may be determined. For example, PSD 530 may be a photodiode that produces two currents in response to illumination by spot 525. One current may include a current signal that is inversely proportional to the distance from a first electrode, and the other current may include a current signal that is inversely proportional to the distance between the spot and the second electrode. Both currents may also include an offset current or an error current. In some example embodiments, the position, x, may be proportional to the following expression:

$$x \propto \frac{I_2 - I_1}{I_2 + I_1}, \qquad \text{(Eq. 2)}$$

where the position, x, may be relative to the center of the PSD, $I_1$ is a current relative to one electrode, and $I_2$ is the current relative to the other electrode. In some example embodiments, more than one PSD may be included at 530 such as two PSDs placed end to end.

In the example in FIG. 5, the detector 522 is configured as a one-dimensional array/PSD. In other implementations, a two-dimensional array/PSD may also be used to determine two angles such as angle 512 and another angle in an orthogonal axis.

In some example embodiments, optical detector 510 may be configured as a time-of-flight detector, or as a hybrid detector to perform both angle sensing and time-of-flight sensing. The following describes a time-of flight detector. A hybrid detector performs both the foregoing angle sensing and the following time-of-flight sensing.

Two or more time-of-flight detectors such optical detectors 145 and 150 may be used to determine the position 110 of vehicle 115 and/or optical detectors 155 and 160 may determine the position 130 of vehicle 113. Each time-of-flight detector may determine the time between when light is transmitted at 170 by a transmitter such as 410A and the light is received by a receiver such as receiver 420A. Similarly, a time-of-flight detector 145 may determine the time between when light is transmitted at 170 by a transmitter such as 410A and light is received by a receiver such as receiver 420B. The position such as position 110 can be determined from the two time-of-flight detectors. See FIGS. 1-4 for further description. As a time-of-flight detector, optical detector 510 may determine the time of a sum of received power across multiple photodetectors 527 or PSD 530. In some example embodiments, time-of-flight detectors 145, 150, 155, and 160 may be combined with optical angle detectors so that both the angle measurements and the time-of-flight information may be processed by a processor to determine the position of reflection such as position 110. Combined angle information and time-of-flight information may be used advantageously to achieve a higher accuracy in the reflected position such as 110.

Figure 6:
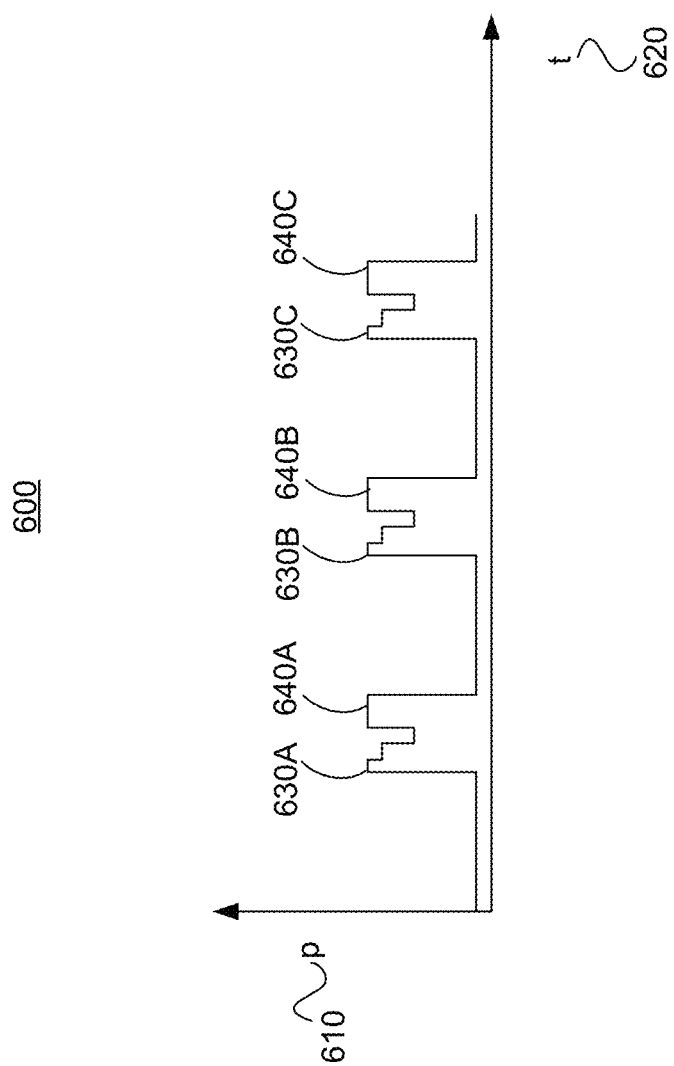
FIG. 6 depicts an example of a plot of transmitted optical power as a function of time, in accordance with some example embodiments.

FIG. 6 depicts an example of a plot of transmitted optical power as a function of time for a transmitter such as transmitter 410A. The description of FIG. 6 includes features from FIGS. 1-5. FIG. 6 at 600 shows optical power 610 along the vertical axis and time 620 along the horizontal axis. In the example of FIG. 6, optical transmitter 410A produces optical power according to a pseudo-random code. Another transmitter such as transmitter 410B produces optical power with a different waveform so that optical receiver 420A can distinguish optical power from transmitter 410A and optical receiver 420B can distinguish optical power from transmitter 410B. In this example, the predetermined pattern of optical power of vehicle of interest 111 starts at 630A with a predetermined power at a predetermined time. The power then varies according to the PN sequence and ends at 640A at another predetermined time and power. The predetermined sequence then repeats at 630B to 640B, and 630C and 640C, and so on as long as the transmitter is transmitting light. In the example of FIG. 6 an amplitude modulation of optical power may be used. In other examples, phase modulation of a carrier may be used or any other modulation. In the example of FIG. 6, three levels of amplitude modulation are shown but any other number of levels may also be used.

Figure 7:
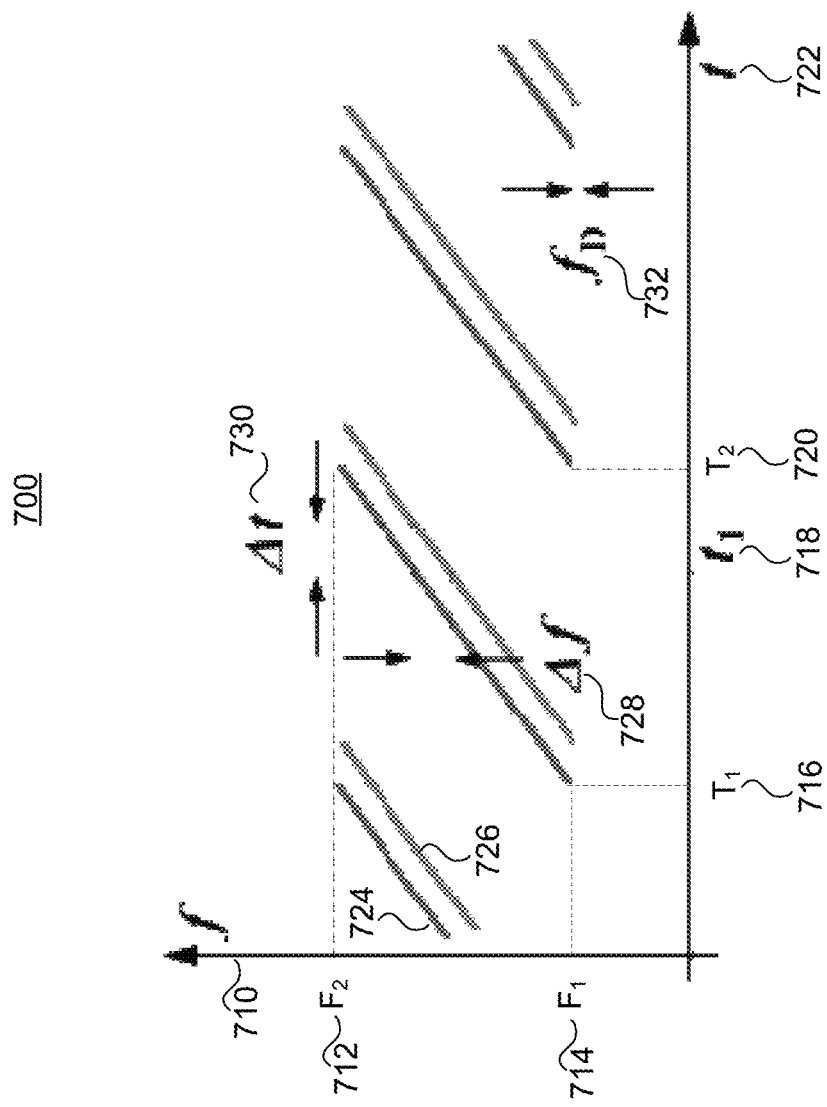
FIG. 7 depicts an example of a plot of frequency verses time for light transmitted from an optical transmitter and received as the transmitted light reflected from another vehicle or object, in accordance with some example embodiments.

FIG. 7 depicts an example of a plot of frequency verses time for light transmitted from an optical transmitter and a plot of light received as reflected light from another vehicle or an object. The description of FIG. 7 includes features from FIGS. 1-6. In some example embodiments, the light from a transmitter such as transmitter 410A may be transmitted and reflected power received by an optical receiver such as optical receiver 420A. The transmitted light may be modulated sinusoidally. The frequency of the transmitted light as a function of time is shown in FIG. 7 for the transmitted light at 724 and the reflected light received from another vehicle or object at 726. The frequency of the modulated light may be swept from $F_1$ at 714 to $F_2$ at 712 over a time from $T_1$ at 716 to $T_2$ at 718, and then repeated. The received light is delayed from the transmitted light in accordance with the time taken for the light to propagate to the reflected location and back to the receiver. The distance to the reflected point can be determined form the difference in time of between the transmitted and received light similar to the time-of-flight detector described above, of from a frequency difference between the transmitted and received light. In some example embodiments, the propagation time for the light corresponds to a frequency shift due to the swept frequency between $F_1$ and $F_2$. The distance from the optical transmitter 410A to the point where light is reflected such as 110 can be determined from the difference in frequency 728 between the transmitted light and received light. The received light may also include a frequency shift at 732 due to the Doppler effect. From the foregoing frequencies and times, the distance to the other vehicle or object and the relative speed can be determined at each optical sensor such as optical sensor 405A. In some example embodiments, a predetermined sequence such as a PN sequence may modulate the transmitted light in addition to the sinusoidal modulation described above. As described above, modulation according to the predetermined sequence may enable filtering out of light (or corresponding signals) from other transmitters. In some example embodiments, the predetermined sequence may be modulated onto the transmitted light using amplitude modulation or any other modulation in addition to the sinusoidal modulation described above.

FIG. 8 depicts a process for determining the location of another vehicle or object. The description of FIG. 8 includes features from FIGS. 1-7. At 810, an optical transmitter at vehicle of interest 111 can transmit light in a predetermined scan pattern such as a raster pattern. At 820, light can be received at a first optical detector at vehicle of interest 111. At 830, light can be received at a second optical detector at vehicle of interest 111. At 840, filtering circuitry can filter out signals from transmitters other than the transmitter at vehicle of interest 111. At 850, the position of the other vehicle or object can be determined from the filtered signal.

At 810, an optical transmitter at vehicle of interest 111 can transmit light in a predetermined scan pattern such as a raster pattern. The transmitted light can be modulated according to a predetermined sequence such as a PN sequence as described above. The predetermined sequence for vehicle of interest 111 can be different from the predetermined sequences associated with other vehicles. For example, the transmitted light may be amplitude modulated according to a predetermined PN sequence associated with 111. The transmitted light may be frequency modulated at a frequency swept over time as described above in FIG. 7.

At 820, light can be received at a first optical detector. For example, a first reflected light from another vehicle at position 110 or object 230 may be received at a detector such as optical detector 145 (one of the detectors in 420A). In some example embodiments that include optical angle detectors as described above, the first reflected light may be received at a first angle between the object and the first optical angle sensor. In some example embodiments that include time-of-flight detectors as described above, the first reflected light may be received at a first time representative of the distance between the first time-of-flight sensor and the reflecting vehicle/object.

At 830, light can be received at a second optical detector positioned at a different position from the first optical detector. For example, a second reflected light from another vehicle at position 110 or object 230 may be received at a detector such as optical detector 150 (another of the detectors in 420A). In some example embodiments that include optical angle detectors as described above, the second reflected light may be received at a second angle between the object and the second optical angle sensor. In some example embodiments that include time-of-flight detectors as described above, the second reflected light may be received at a second time representative of the distance between the second time-of-flight sensor and the reflecting vehicle/object. The first and second optical detectors can be angle detectors, time-of-flight detectors, or hybrid detectors as described above.

At 840, filtering circuitry can filter a first signal representative of the first reflected light modulated according to the predetermined pattern associated with vehicle 111 and remove other signals modulated according to predetermined sequences not associated with vehicle of interest 111. The circuitry can similarly filter a second signal representative of the second reflected light modulated according to the predetermined pattern for vehicle 111 and remove other signals modulated according to predetermined sequences not associated with vehicle of interest 111. The filtering may include digital filtering such a transversal filtering or any type of matched filter or other digital filter performed by at least one processor. The filtering may include analog filtering as well.

At 850, the position of the other vehicle or object is determined from the filtered first and second signals. For example, two angles may be determined from the first and second signals from two optical angle sensors. From the two angles, the position 110 or 230 may be determined. In another example, two distances may be determined from the first and second times from two time-of-flight detectors or from the difference in frequency as described with respect to FIG. 7. From the two distances, the position 110 or 230 may be determined.

Figure 9A:
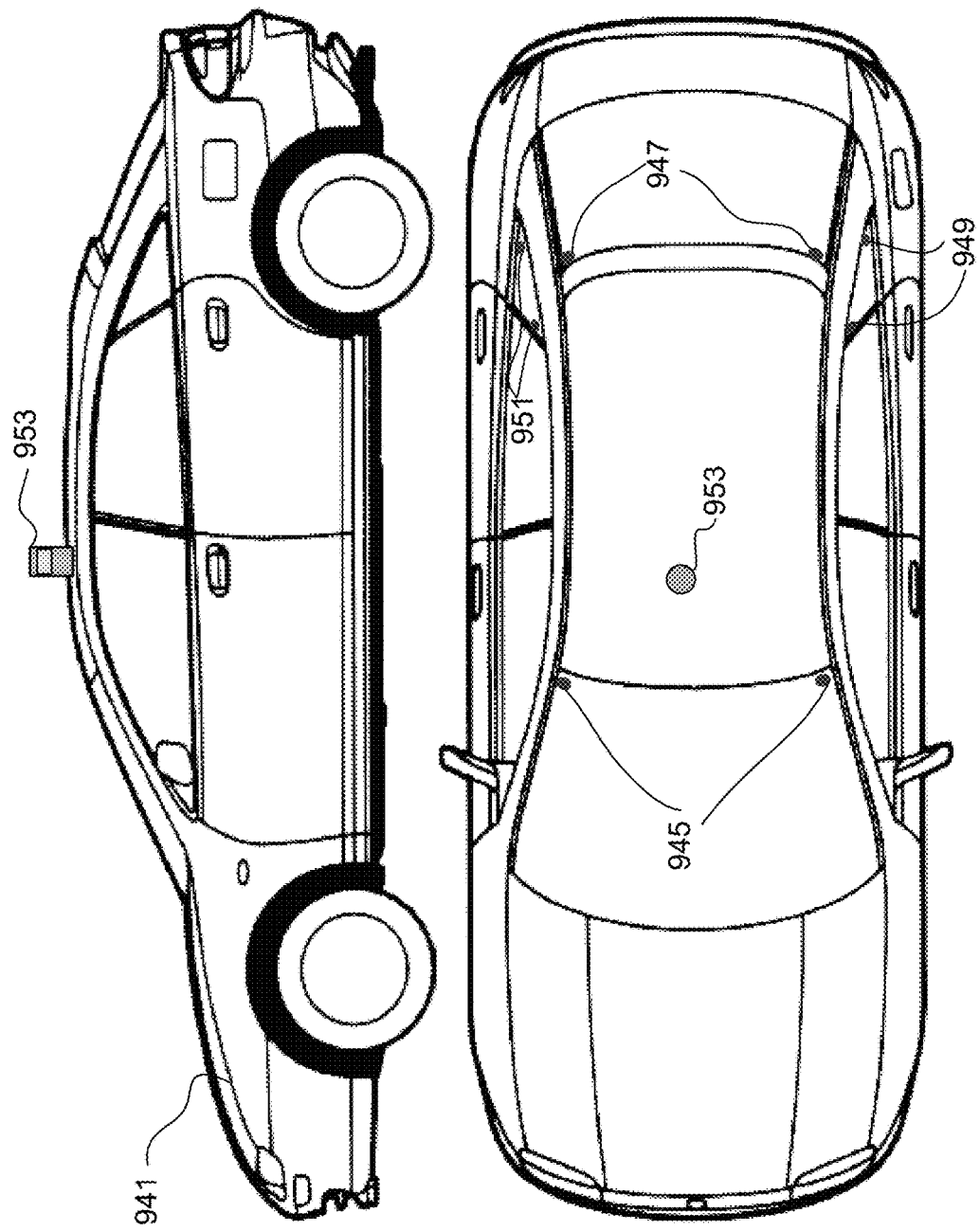
FIG. 9A depicts an example of an optical transmitter and an optical receiver with multiple optical detectors, in accordance with some example embodiments.

FIG. 9A depicts an optical transmitter such as transmitter 410A and an optical receiver such as optical receiver 420A with multiple optical detectors. The description of FIG. 9A includes features from FIGS. 1-8. In the example of FIG. 9A, the optical transmitter 953 is mounted on the roof of vehicle 941. Optical detectors 945 can be mounted near the top right and left edges of the windshield or nearby body chassis areas. Optical detectors 945 may detect light impinging on the front of vehicle 941 or the front side area of 941. In the example of FIG. 9A, detectors 949 and 951 can be mounted near the rear quarter window area on both sides of vehicle 941 or on the body in the same areas. Detectors 949 and 951 can detect light impinging on vehicle 941 from the side. Detectors 947 can be mounted near the rear window area on both sides of vehicle 941 or on the body in the same areas. Detectors 947 can detect light impinging on vehicle 941 from the rear. Although detectors 945, 947, 949, and 951 are shown mounted in specific locations on vehicle 941, one or more of the detectors may be mounted in other locations. Detectors 945, 947, 949, and 951 can be optical angle detectors, time-of-flight detectors, and/or hybrid detectors. When optical angle detectors are used, each angle detector can cover approximately 90-degrees each.

Figure 9B:
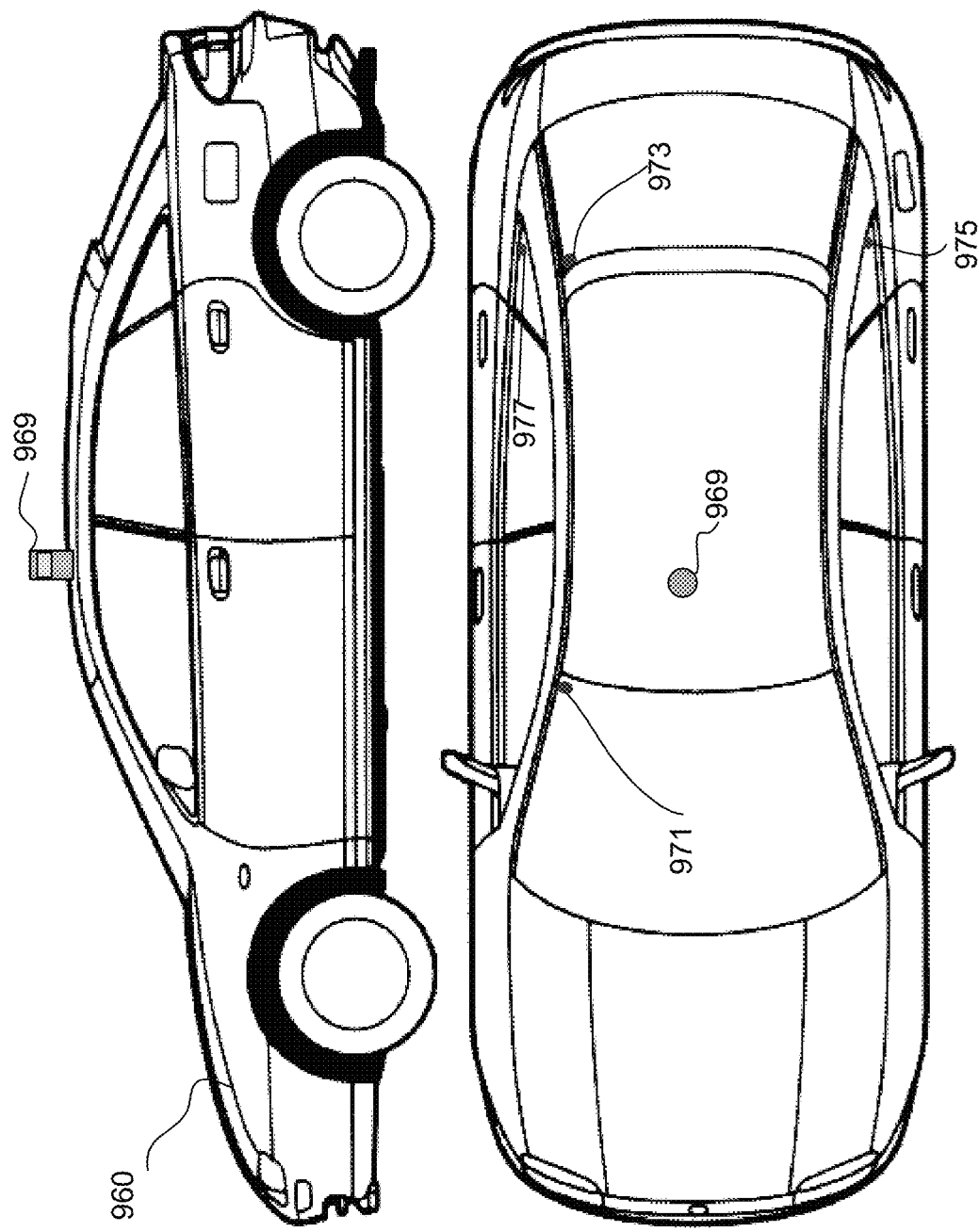
FIG. 9B depicts another example of an optical transmitter and an optical receiver with multiple optical detectors, in accordance with some example embodiments.

FIG. 9B depicts an optical transmitter such as transmitter 410A and an optical receiver such as optical receiver 420A with multiple optical detectors. The description of FIG. 9B includes features from FIGS. 1-8, and 9A. FIG. 9B differs from FIG. 9A in that single detectors rather than two detectors are located at the front, sides, and rear of vehicle 960. In the example of FIG. 9B, the optical transmitter 969 is mounted on the roof of vehicle 960. Optical detector 971 can be mounted near the top right or left edge of the windshield or nearby body chassis area. Optical detectors 971 may detect light impinging on the front of vehicle 941 or the front side area of 941. In the example of FIG. 9B, detectors 975 and 977 can be mounted near the rear quarter window area on both sides of vehicle 960, or on the body in the same areas. Detectors 975 and 977 can detect light impinging on vehicle 941 from the side. Detectors 947 can be mounted near the rear window area on both sides of vehicle 941 or on the body in the same areas. Detectors 947 can detect light impinging on vehicle 941 from the rear. Although detectors 945, 947, 949, and 951 are shown mounted in specific locations on vehicle 941, one or more of the detector s may be mounted in other locations. Detectors 945, 947, 949, and 951 can be optical angle detectors, time-of-flight detectors, and/or hybrid detectors. When optical angle detectors are used, each angle detector can cover approximately 180-degrees each.

Figure 10:
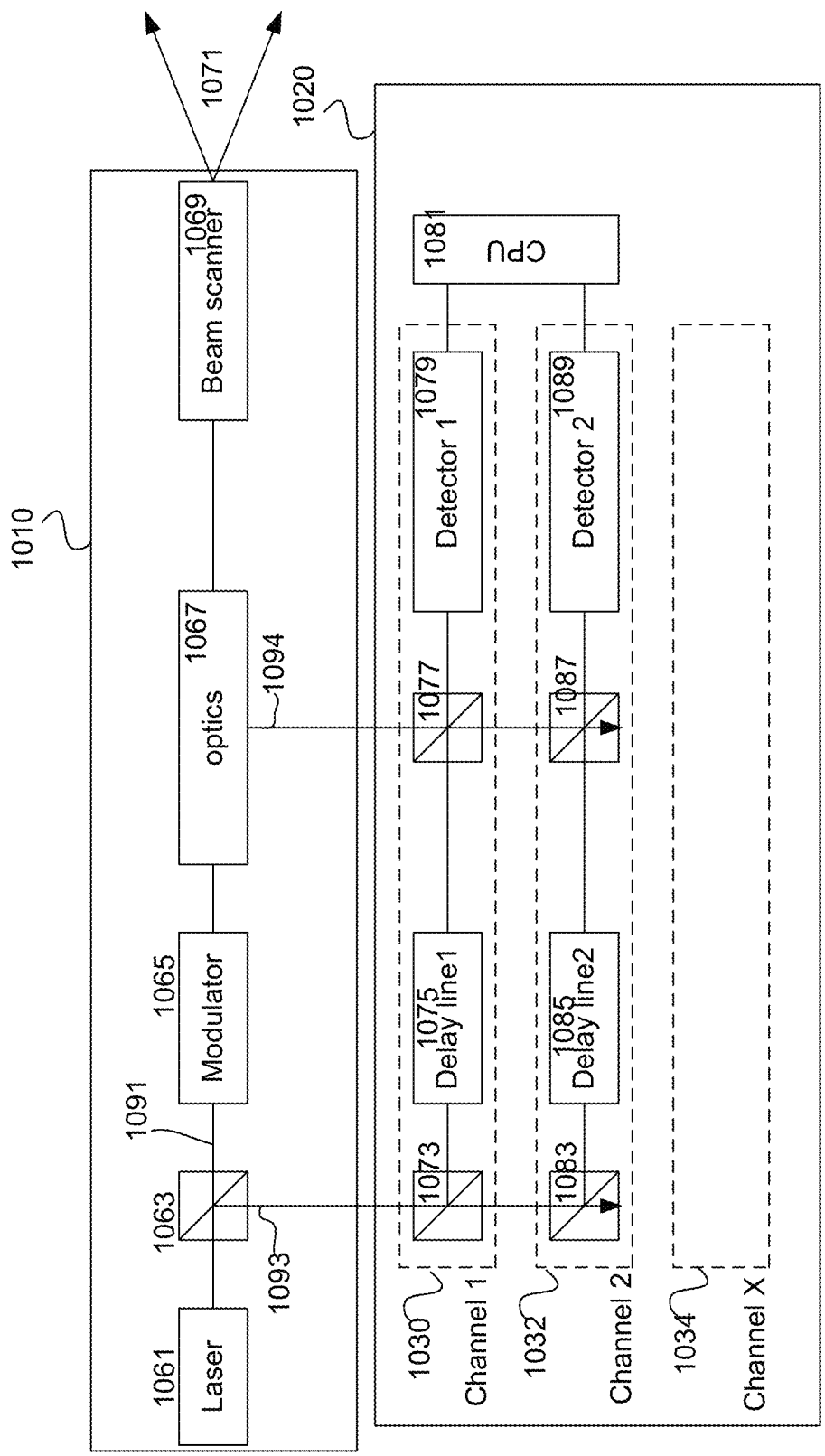
FIG. 10 depicts an example of an optical transceiver, in accordance with some example embodiments.

FIG. 10 depicts an optical transceiver including optical transmitter 1010 and optical receiver 1020. Optical transmitter 1010 may provide a portion of the unmodulated light from the light source as an optical "local oscillator" and a portion of the received modulated light to receiver 1020 to enable coherent detection at optical receiver 1020. For example, beamsplitter 1063 can send a portion of the light 1093 from laser 1061 to optical receiver 1020, and optics 1067 can send a portion of the received light 1094 to optical receiver 1020. Light portions 1093 and 1094 enable coherent detection at receiver 1020. Coherent detection can provide an improved signal-to-noise ratio at receiver 1020 over non-coherent detection. In some example embodiments, transmitter 1010 and receiver 1020 may be co-located at one location. The description of FIG. 10 includes features from FIGS. 1-8, 9A, and 9B.

Optical transmitter 1010 can include laser 1061, beamsplitter 1063, modulator 1065, optics 1067, and beam scanner 1069 to produce transmitted light 1071 for illuminating vehicles and objects. Beamsplitter 1063 passes a portion 1093 of the light from laser 1061 to modulator 1065 and a portion 1093 to beamsplitter 1073. The modulator 1065 may on-off key the light to optics 1067 according to a predetermined sequence and/or modulator 1065 may modulate the light to optics 1067 according to a sinusoidal carrier. The sinusoidal carrier may be further modulated using phase modulation, amplitude modulation, optical polarization modulation, or any other modulation according to the predetermined sequence and/or a frequency sweep as described with respect to FIG. 7. Optics 1067 can pass a portion of the light from modulator 1065 to beam scanner 1069. Beam scanner 1069 may scan the light according to a predetermined scan pattern such as a rectangular raster pattern or any other raster pattern. Optical transmitter 1010 transmits light at 1071 to illuminate objects and vehicles.

Optical receiver 1020 can include beamsplitters 1073 and 1083 to direct a portion of the unmodulated laser light 1093 to a delay line 1075 and another portion to beamsplitter 1083. Beamsplitter 1083 can direct a portion of the light to delay line 1085 and another portion to the next channel at 1034. Delay line 1075 can delay in time the light from beamsplitter 1073. The time delay may correspond to a one or more coherence lengths of laser 1061, or portions of a coherence length. Laser 1061 can produce coherent light for a predetermined time (coherence time) or corresponding distance. Beyond the coherence length of laser 1061, the light may not be coherent and may be unsuitable for coherent detection. Delay lines 1075 and 1085 delay the light from beamsplitters 1073 and 1083 so that the received light from another vehicle or object at 1094 is coherent with respect to the light out of delay line 1075 and/or 1085. The received light at 1094 is delayed due to the round-trip distance/time to object or vehicle. Delay lines 1075/1085 can be chosen so that at least one of the delay lines 1075/1085 or another delay line produces light that coherent with the received light at beamsplitters 1077/1087 or another beamsplitter. Coherent detection can provide differentiation between light from laser 1061 and light from another laser from another vehicle (even if the same model of laser) because each laser is coherent with light produced by itself within the coherence time/length buy may not be coherent with light from another laser. Coherent detection can provide filtering of light from other vehicles and sources similar to filtering based on a predetermined code described above. In some example embodiments, detectors 1079/1089 may be one dimensional or two dimensional arrays of photodetectors or position sensitive devices as described above. Detectors 1079/1089 may perform as time-of-flight detectors as describes above. Photodetectors 1079/1089 may include imaging detectors such as a camera. Coherent detection may produce an interference pattern that can be imaged by detectors 1079/1089. Processor 1081 may apply digital filtering to the interference pattern to filter out signals from other sources such as other vehicles. Receiver 1020 including processor 1081 can determine the location of one or more vehicles and/or objects.

Figure 11:
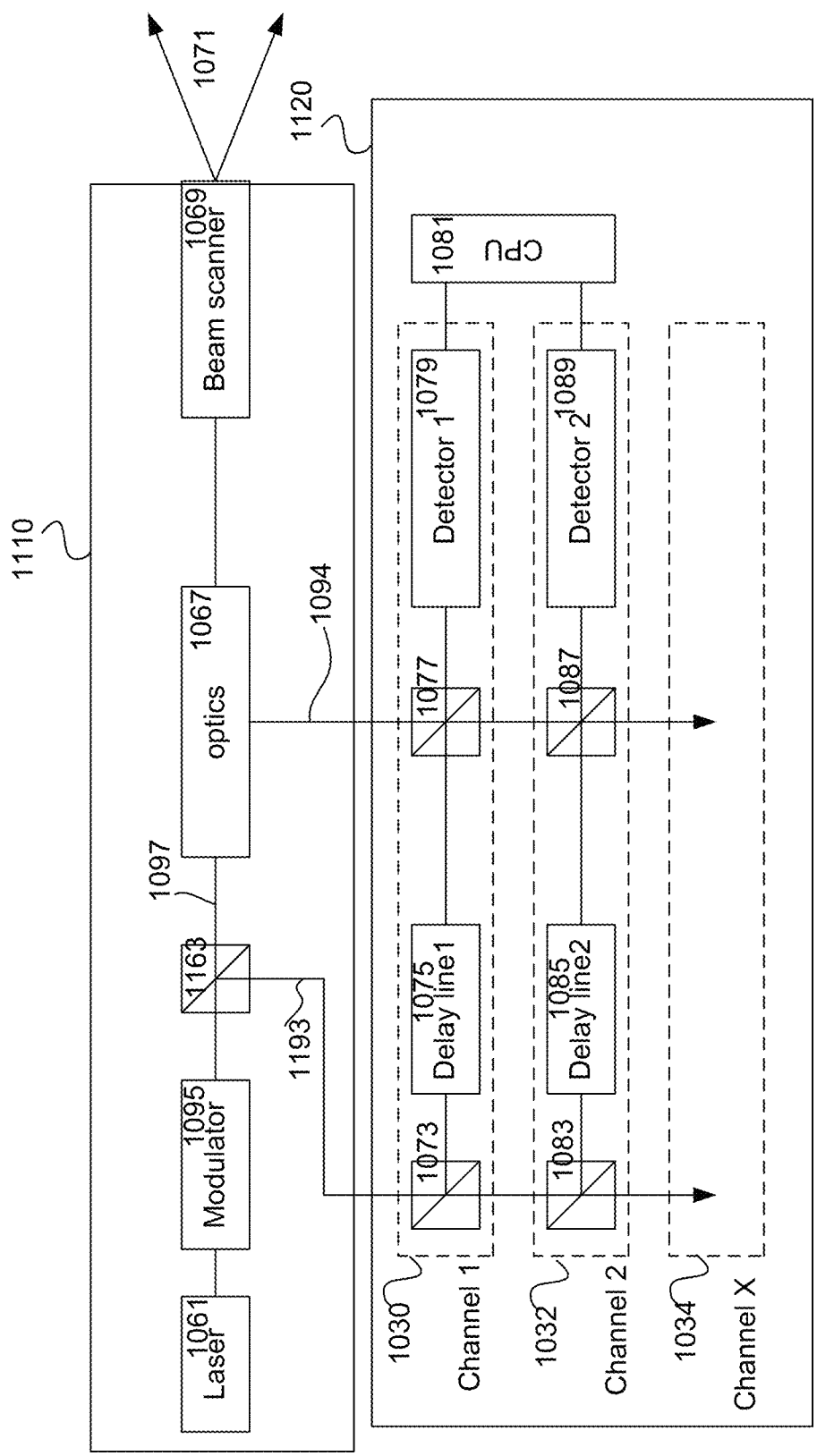
FIG. 11 depicts another example of an optical transceiver, in accordance with some example embodiments.

FIG. 11 depicts an optical transceiver including optical transmitter 1110 and optical receiver 1120. Optical transmitter 1110 may provide a portion of the modulated light from the light source and a portion of the received light to receiver 1120 to enable coherent detection at optical receiver 1120. In some example embodiments, modulator 1095 can modulate laser 1061 according to a swept sinusoidal frequency as described above. In some example embodiments, modulator 1095 can modulate laser 1061 according to a predetermined pattern as described above. Compared to FIG. 10, FIG. 11 shows modulator 1095 inserted into transmitter 1110 before beamsplitter 1163, whereas FIG. 10 includes beamsplitter 1063 before modulator 1095. Placing modulator 1095 before the beamsplitter 1163 that sends light to receiver 1120 enables coherent detection of the sinusoidally modulated light. For example, beamsplitter 1163 can send a portion of the modulated light 1193 from laser 1061 to optical receiver 1120, and optics 1067 can send a portion of the received light 1094 to optical receiver 1120. Light portions 1193 and 1094 enable coherent detection as described in FIG. 10. Coherent detection can also be performed on the swept frequency modulated light described with respect to FIG. 7. Coherent detection of the sinusoidally modulated light can provide an improved signal-to-noise ratio at receiver 1120 over non-coherent detection of the sinusoidally modulated light. In some example embodiments, transmitter 1110 and receiver 1120 may be co-located.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for determining a position of an object based on optical sensing, comprising:
    a transmitter that produces light and modulates the produced light based on a predetermined pattern;
    a first optical angle sensor and a second optical angle sensor spaced from each other along a base line by a separation distance and located at fixed positions on the base line to receive light reflected from an object illuminated by the produced light from the transmitter,
    wherein the first optical angle sensor is configured to receive from an object a first reflected portion of the light reflected from the object and to process the first reflected portion of the light reflected from the object to determine a first angle between a first line of sight linking the object and the first angle sensor and the base line;
    wherein the second optical angle sensor is configured to receive a second reflected portion of the light reflected from the object and to process the second reflected portion of the light reflected from the object to determine a second angle between a second line of sight linking the object and the second angle sensor and the base line; and
    circuitry to receive the first angle and the second angle from the first and the second optical angle sensors and to determine the position of the object with respect to the first and second optical angle sensors based on at least a distance determined by the circuitry from a relationship between the distance, the separation distance between the first and second optical angle sensors, the first angle, and the second angle.

2. The apparatus of claim 1, wherein the circuitry filters out interfering signals corresponding to interfering light and passes signals from the first and the second optical angle sensors corresponding to the first and second reflected portions received from the transmitter.

3. The apparatus of claim 1, wherein the first optical angle sensor receives the first reflected portion at a first time, wherein the second optical angle sensor receives the second reflected portion at a second time, and wherein the circuitry further determines the position of the object based on the first time and the second time.

4. The apparatus of claim 1, wherein the predetermined pattern includes a swept frequency modulation, wherein the position of the object is determined from a frequency difference between the light and the first or second reflected light.

5. The apparatus of claim 1, wherein the predetermined pattern includes a pseudo-noise sequence for reducing or eliminating interference from other light sources.

6. The apparatus of claim 1, further comprising:
    a first time-of-flight optical detector located near the first optical angle sensor and structured to receive the first reflected portion to measure a first time of flight between the object and the first time-of-flight optical detector and a second time-of-flight optical detector located near the second optical angle sensor and structured to receive the second reflected portion to measure a second time of flight between the object and the second time-of-flight optical detector, wherein the circuitry is coupled to receive the first and second times of flight from the first and the second time-of-flight optical sensors and to determine the position of the object with respect to the first and second time-of-flight optical sensors.

7. The apparatus of claim 1, wherein the light is generated by a laser.

8. The apparatus of claim 1, wherein the first optical angle sensor includes a one or two dimensional array of photodiodes and the second optical angle sensor includes another one or two dimensional array of photodiodes.

9. The apparatus of claim 1, wherein the first optical angle sensor includes a one or two dimensional position sensitive detector and the second optical angle sensor includes another one or two dimensional position sensitive detector.

10. The apparatus of claim 1, wherein the first optical angle sensor includes a camera and the second optical angle sensor includes another camera.

11. The apparatus of claim 1, wherein the relationship is expressed as:

$$B = A\frac{\sin(\theta)}{\sin(\alpha)},$$

wherein B is the distance, A is the separation distance, θ is the first angle, and α is the second angle.

12. The apparatus of claim 1, wherein the first and second optical angle sensors each include a position sensitive detector (PSD) producing a first current signal inversely proportional to a first distance between a spot of light illuminating the PSD and a first electrode, and producing a second current signal inversely proportional to a second distance between the spot of light illuminating the PSD and a second electrode, wherein a spot position indicative of an angle is expressed as:

$$x \propto \frac{I_2 - I_1}{I_2 + I_1},$$

wherein x is the spot position, $I_1$ is the first current signal, and $I_2$ is the second current signal.

13. A method for determining locations of objects in proximity to a vehicle based on optical sensing, comprising:
transmitting light that is modulated based on a predetermined pattern generating at least a first portion of the light and a second portion of the light;
determining, at a first optical angle sensor located at a first fixed position, a first angle between a base line between the first optical angle sensor and a second optical angle sensor and a first line of sight linking the object and the first optical angle sensor, wherein the first angle is determined from the first portion of the light reflected from the object, wherein the first portion of the light is received at the first angle;
determining, at the second optical angle sensor located at a second fixed position separated from the first optical sensor by a separation distance, a second angle between the base line and a second line of sight linking the object and the second optical angle sensor, wherein the second angle is determined from the second portion of the light reflected from the object, and wherein the second portion of the light is received at the second angle;
filtering, at circuitry, to leave a first signal representative of the first angle and to leave a second signal representative of the second angle, and to remove other signals from the first signal and the second signal corresponding to other predetermined patterns;
determining the first angle and the second angle from the filtered first signal and the filtered second signal; and
determining a position of the object with respect to the first and second optical angle sensors from at least a distance determined by the circuitry from a relationship between the distance, a separation distance between the first and second optical angle sensors, the first angle and the second angle.

14. The method of claim 13, wherein the circuitry filters out interfering signals corresponding to interfering light and passes the first signal and the second signal.

15. The method of claim 13, wherein the first optical angle sensor receives the first reflected light at a first time, wherein the second optical angle sensor receives the second reflected light at a second time, and wherein the circuitry further determines the position of the object based on the first time and the second time.

16. The method of claim 13, wherein the predetermined pattern includes a swept frequency modulation, wherein the position of the object is determined from a frequency difference between the light and the first or second reflected light.

17. The method of claim 13, wherein the predetermined pattern includes a pseudo-noise sequence for reducing or eliminating interference from other light sources.

18. The method of claim 13, further comprising:
receiving a first time-of-flight optical detector located near the first optical angle sensor the first reflected portion to measure a first time of flight between the object and the first time-of-flight optical detector and a second time-of-flight optical detector located near the second optical angle sensor and structured to receive the second reflected portion to measure a second time of flight between the object and the second time-of-flight optical detector, wherein the circuitry is coupled to receive the first and second times of flight from the first and the second time-of-flight optical sensors and to determine the position of the object with respect to the first and second time-of-flight optical sensors.

19. The method of claim 13, wherein the first optical angle sensor includes a one or two dimensional array of photodiodes and the second optical angle sensor includes another one or two dimensional array of photodiodes.

20. The method of claim 13, wherein the first optical angle sensor includes a one or two dimensional position sensitive detector and the second optical angle sensor includes another one or two dimensional position sensitive detector.

21. The method of claim 13, wherein the first optical angle sensor includes a camera and the second optical angle sensor includes another camera.

22. An apparatus for determining a position of an object based on optical sensing, comprising:
a transmitter that produces light for optical sensing and modulates the light based on a predetermined pattern generating at least a first portion of the light and a second portion of the light;
a first optical sensor and a second optical sensor spaced from each other along a base line by a separation distance and located at fixed positions on the base line to receive light reflected from an object illuminated by the produced light from the transmitter,
wherein the first optical sensor is configured to determine a first angle between a first line of sight linking the object and the first optical sensor and the base line from the first portion of the light reflected from the object at a first time, and
wherein the second optical sensor is configured to determine a second angle between a second line of sight linking the object and the second optical sensor and the base line from the second portion of the light reflected from the object at a second time; and
circuitry to receive the first time, the second time, the first angle, and the second angle from the first and the second optical sensors and to determine the position of the object with respect to the first and second optical angle sensors based on at least a distance determined by the circuitry from a relationship between the distance, a separation distance between the first and second optical sensors, the first time, the second time, the first angle, and the second angle.

23. The apparatus of claim 22, wherein the circuitry filters out interfering signals corresponding to interfering light and passes signals from the first and the second optical angle sensors corresponding to the first and second portions of light received from the transmitter.

24. The apparatus of claim 22, wherein the predetermined pattern includes a swept frequency modulation, wherein the position of the object is determined from a frequency difference between the light and the first or second reflected light.

25. The apparatus of claim 22, wherein the predetermined pattern includes a pseudo-noise sequence for reducing or eliminating interference from other light sources.

26. The apparatus of claim 22, wherein the first optical sensor coherently detects the first reflected light and the second optical sensor coherently detects the second reflected light.

27. The apparatus of claim 22, wherein the first optical sensor includes a one or two dimensional array of photodiodes and the second optical sensor includes another one or two dimensional array of photodiodes.

28. The apparatus of claim 22, wherein the first optical sensor includes a one or two dimensional position sensitive detector and the second optical sensor includes another one or two dimensional position sensitive detector.

29. The apparatus of claim 22, wherein the first optical sensor includes a camera and the second optical sensor includes another camera.

30. A method for determining locations of objects in proximity to a vehicle based on optical sensing, comprising:
transmitting light that is modulated based on a predetermined pattern generating at least a first portion of the light and a second portion of the light;
determining, at a first optical sensor located at a first fixed position, a first angle between a base line between the first optical sensor and a second optical sensor and a first line of sight linking the object and the first optical sensor, wherein the first angle is determined from the first portion of the light reflected from the object, and wherein the first portion of the light is received at a first time;
determining, at a second optical sensor located at a second fixed position separated from the first optical sensor by a separation distance, a second angle between the base line and a second line of sight linking the object and the second optical sensor, wherein the second angle is determined from the second portion of the light reflected from the object at a second time, and wherein the second portion of the light is received at the second angle; and
filtering, at circuitry, to leave a first signal representative of the first angle received at the first time and to leave a second signal representative of the second angle received at the second time, and to remove other signals from the first signal and the second signal based on other predetermined patterns;
determining the first angle received at the first time and second angle received at the second time from the filtered first signal and the filtered second signal; and
determining a position of the object with respect to the first and second optical angle sensors from at least a distance determined by the circuitry from a relationship between the distance, a separation distance between the first and second optical sensors, the first angle, the first time, the second angle, and the second time.

31. The method of claim 30, wherein the circuitry filters out interfering signals corresponding to interfering light and passes the first signal and the second signal.

32. The method of claim 30, wherein the first optical sensor receives the first reflected light at a first angle, wherein the second optical angle sensor receives the second reflected light at a second angle, and wherein the circuitry further determines the position of the object based on the first angle and the second angle.

33. The method of claim 30, wherein the predetermined pattern includes a swept frequency modulation, wherein the position of the object is determined from a frequency difference between the light and the first or second reflected light.

34. The method of claim 30, wherein the predetermined pattern includes a pseudo-noise sequence for reducing or eliminating interference from other light sources.

35. The method of claim 30, wherein the first optical sensor coherently detects the first reflected light and the second optical sensor coherently detects the second reflected light.

36. The method of claim 30, wherein the light is generated by a laser.

37. The method of claim 30, wherein the first optical sensor includes a one or two dimensional array of photodiodes and the second optical sensor includes another one or two dimensional array of photodiodes.

38. The method of claim 30, wherein the first optical sensor includes a one or two dimensional position sensitive detector and the second optical sensor includes another one or two dimensional position sensitive detector.

39. The method of claim 30, wherein the first optical sensor includes a camera and the second optical sensor includes another camera.

* * * * *